INVENTOR.
Raymond P. Glowiak,
BY Parker & Carter
Attorneys.

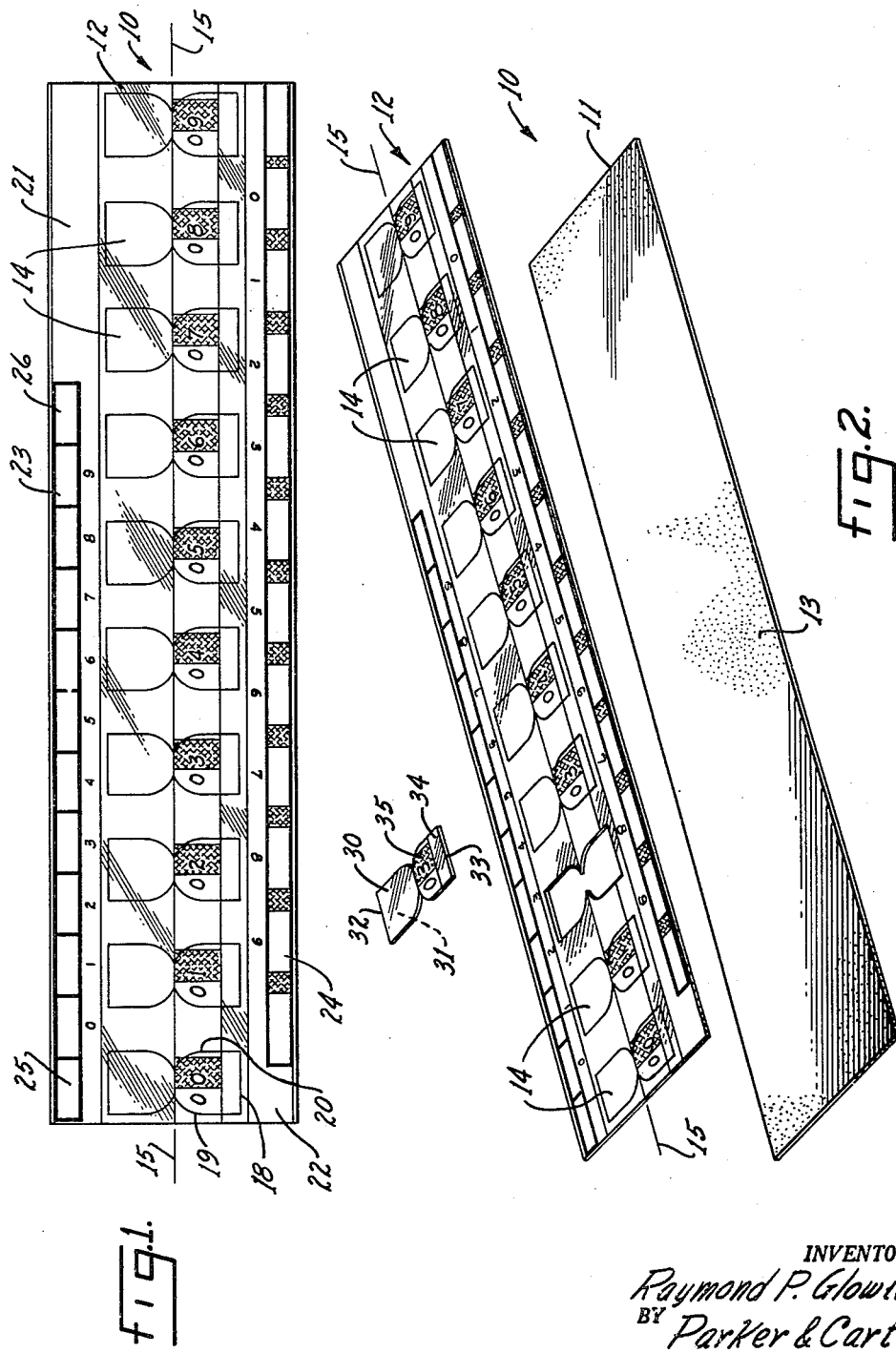

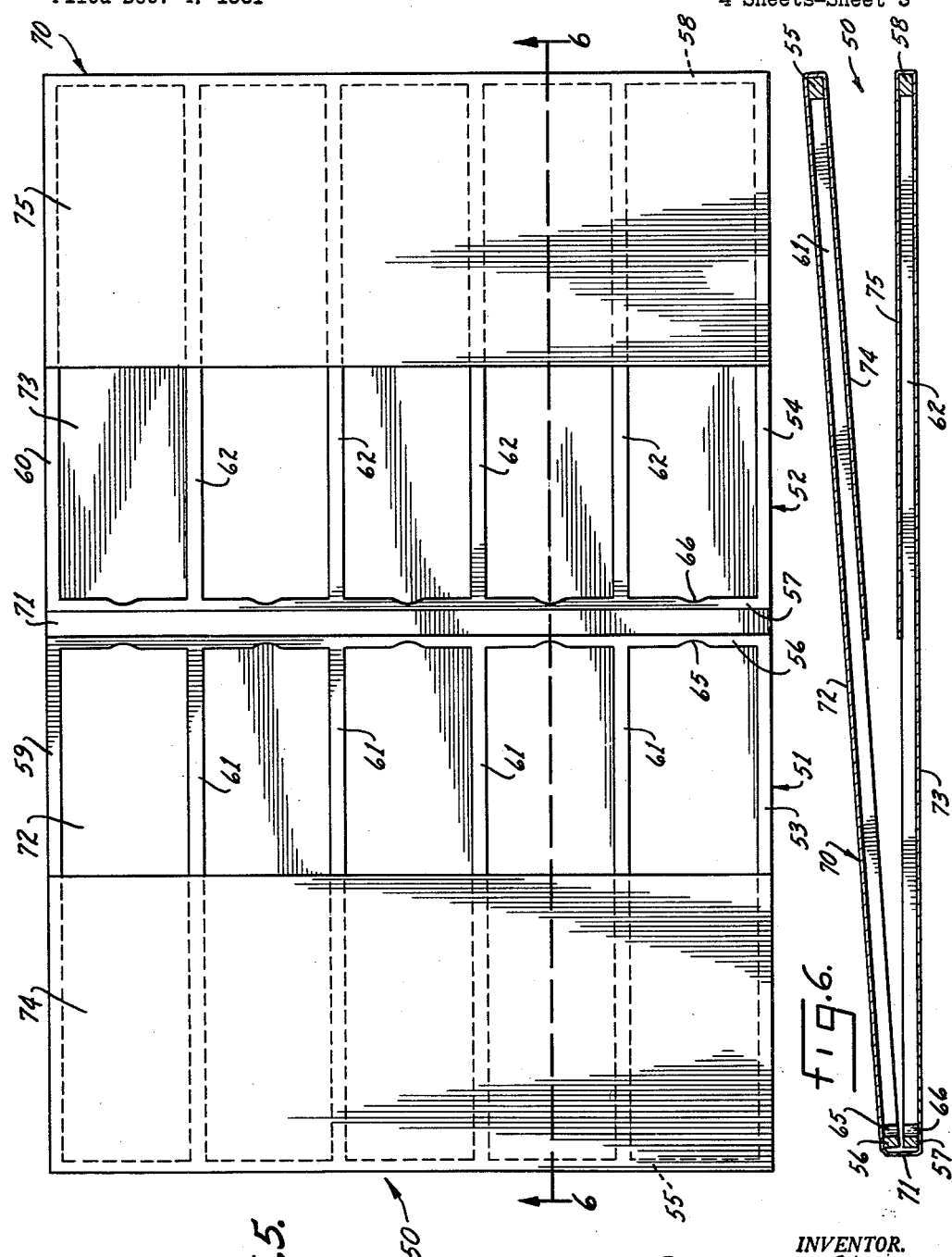

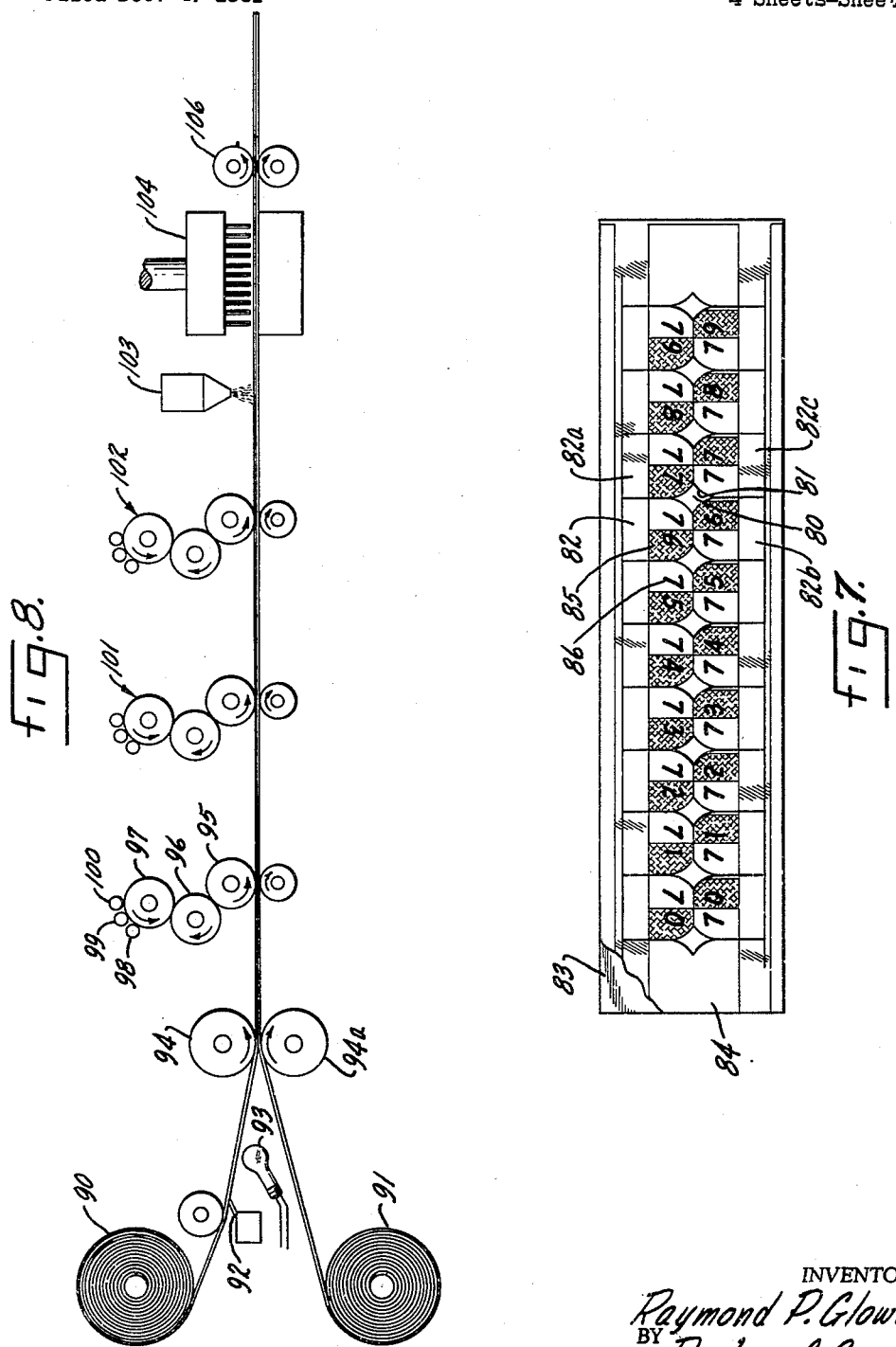

United States Patent Office 3,191,767
Patented June 29, 1965

3,191,767
INDEX TAB CARD CONVERTERS
Raymond P. Glowiak, 120 Polk St., Chicago, Ill.
Filed Dec. 4, 1961, Ser. No. 158,932
9 Claims. (Cl. 206—56)

This application is a continuation-in-part of Serial No. 21,190, filed April 11, 1960, now abandoned.

This invention relates to card filing systems, and particularly to means for quickly and efficiently converting a conventional card filing system to a speedy, easy to use key number system.

In the standard index card system in use in thousands of offices today the information is nearly always classified by a code system. Probably the two most common code systems are an alphabetical system and a numerical system although numbers and letters may be combined of course for special purposes. To obtain information from a card classified on a numerical basis, such as a consecutive number system, substantially the following procedure must be followed.

The card containing the desired information must be located, removed, and the desired information transferred to or from it. The card must then be returned to its specified position in the system. In small loan offices for example in which filing is usually done on an account number basis, a filing clerk will pull from a card index file all of the account numbers which represent loans upon which a payment is due that day. Since in any consecutive span of numbers some accounts will be inactive, and therefore absent from the files, it is necessary for the file clerk to first locate the approximate position in the consecutively numbered series and then move either forward or backward until the exact card is located. Because of the absence of some cards, the account number on each card must be checked when the account number is being approached to insure that the correct card is obtained. This is a time consuming procedure because the body of the card must be checked, and it requires some manual dexterity.

At the end of the day, after the loanee has made his payment and the information has been entered on the card, the file clerk must repeat the above described procedure. That is, the exact position of each card in the file must be located and the card filed in its proper position. This is extremely important because a lost card would be almost the equivalent of a discharged account. To return each individual card, the file clerk must thumb through a series of cards to be sure that the returning card drops into its proper place.

There are several presently known methods of converting the above described type of index card filing system to a tab type of system. Generally they are unsatisfactory however because the time and labor involved in making the change is quite out of proportion to the benefit derived. In addition, in many conversion systems the type of tab used has been such as to obscure or, in fact, cover up pertinent information printed near the top of the card. Even when the conversion is completed however little has been accomplished other than to elevate the basic account number which merely reduces the manual dexterity required. The problems of placement and replacement of the cards in proper order along with the mental effort involved in these operations remains.

Accordingly, a primary object of this invention is to provide means for quickly and inexpensively converting conventional index card filing systems to a speedy, easy-to-use key number system.

Another object is to provide a key number index card filing system which eliminates the necessity of maintaining chronological or numerical order of any kind within the system to thereby drastically reduce the time spent in pulling and returning individual cards to the system.

Yet another object is to provide a key number index card filing system which eliminates searching a group of cards maintained in physically close proximity to the index card containing the filing information desired.

Another object is to provide a key number index card filing system which completely eliminates the necessity of filing the cards in a given sequence.

Yet another object is to provide a key number index card filing system in which misfiling is impossible.

Yet another object is to provide a converter for an index card filing system which provides automatic spacing of the individual key tabs on the cards.

Yet another object is to provide index card converter units.

Yet another object is to provide an index card converter assembly including a dispenser which identifies and presents the card converters for use.

A still further object is to provide an index card converter assembly which includes a dispenser which is used jointly with said index card converters.

Yet a further object is to reduce the time necessary to locate and return cards to the system.

Another object is a method for making said index card converters.

Other objects will become apparent upon reading the following description of the invention.

The invention is illustrated more or less diagrammatically in the accompanying drawings, wherein:

FIGURE 1 is a top plan view of an index card converter comprising a set of 10 tabs suitable for converting 10 conventional cards to a key number and color code filing system;

FIGURE 2 is an exploded view of the index card converter of FIGURE 1;

FIGURE 5 is a top plan view of an index card conversion kit holder;

FIGURE 6 is a view to an enlarged scale taken substantially along the line 6—6 of FIGURE 5 illustrating the kit in a nearly folded position;

FIGURE 7 is a modified index card converter; and

FIGURE 8 is a diagrammatic assembly for preparing index card converters.

Like reference numerals will be used to refer to like parts throughout the following description of the drawings.

Figure 3:
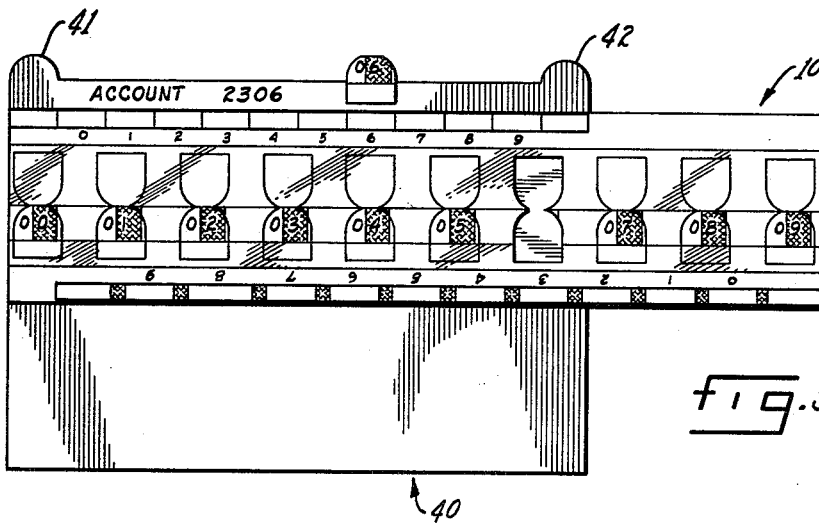
FIGURE 3 is a plan view of an index card converter in use illustrating means for automatically correctly positioning an index tab on a conventional index card.

An index card converter is indicated generally at 10 in FIGURES 1 and 2. The converter consists essentially of a flexible backer sheet 11 of any suitable material, such as kraft paper. In the illustrated embodiment, the length of the sheet is substantially longer than its thickness. A facing or tab sheet is indicated generally at 12. This sheet may be composed of any suitable transparent material, such as cellulose actate, also known simply as "acetate." The material is so cut as to be co-extensive with the backer sheet 11. Although any suitable materials may be used for either the backer or the tab sheet, I have discovered that the backer sheet may advantageously be a kraft paper on the order of .003 inch thick, and the working sheet a cellulose acetate film on the order of .005 inch thick. In any event, the tab or working sheet should be substantially harder than the backer sheet, though this is not absolutely essential in all applications. The two sheets are secured one to another by a conventional pressure sensitive adhesive indicated generally at 13. As illustrated, the adhesive is shown in contact with the backer sheet 11, but it is immaterial as to which of the opposing faces of the backer and tab sheets it is applied, so long as it is removable with the punched areas of the tab sheet.

Various pressure sensitive adhesives are suitable, and such adhesives are well known in the art. Included in such groups as representative adhesives are rubber adhesives which are formed by blending rubber as a latex or in solution form with natural resins such as rosin or rosin esters. The term "pressure sensitive adhesive" is recognized in the art and may be re-stated herein to mean an adhesive mass which is made to adhere upon application of pressure and is separated from adherence by a pulling force. Such adhesive masses are commonly found on cellophane and other tapes.

A plurality of punched tab areas are indicated at 14. Each tab area, of which in this instance there are 10, is aligned one with another longitudinally along the converter and each is of substantially identical configuration. In this instance, each punched area is symmertical about a line of symmetry indicated at 15. Any suitable means of punching the tab areas in the acetate facing sheet may be utilized, so long as the backer sheet is not cut through.

The upper face of the tab sheet carries a discontinuous indicia receiving surface extending its length which overlies the tab areas. Such surface utilizes either partially or wholly an identifying color to alert the operator. Color is the preferred identifying means but equivalent means, such as a striking design, would also function. In the illustrated embodiment, the indicia receiving surface is a coating of colored ink which may be applied in any conventional manner. Imprinted upon the indicia receiving surface are a series of consecutive reference numbers commencing with 00 and ending with 09. In this instance, the reference numbers are located in the upper part of the lower half of the symmetrical tab area, that is, in the area bounded by the line of symmetry 15, lower edge 18, and sides 19 and 20. The bounded area in this instance is shown divided by color in the sense that the right half of each area is a solid color, while the left half is not. One of the digits of each number appears in the colored area and the other in the uncolored area. The bounded area may also be completely colored. This will be further described. The color may be laid down on the material from ordinary offset printing ink. Various ink and color compositions can be used and such a selection will be influenced, in part, by the indicia material used. Different material may take or absorb different ink and color compositions to different degrees. It is only intended that a certain color of true hue be retained on the particular material used. Offset printer's ink has been found useful with cellulose acetate material. It is further found that the softer the acetate, the more readily will the colored ink be absorbed. Such a relationship between the film and the ink can be easily ascertained by those skilled in the art.

The "softness" or "stiffness" of the acetate will, of course, be determined by the amount of plasticizer incorporated in the acetate. Plasticizers such as dimethyl phthalate, diethyl phthalate, di(methoxyethyl) phthalates and lower alkyl pthalyl ethyl glycolotes are well known, and the use of such plasticizers to attain various softness and stiffness of the acetate is also well known and determinable by recognized process steps.

The offset printer's ink which may be used for applying color to the acetate is preferably present as a composition containing a selected amount of an alkyd varnish which is a solution of an alkyd resin in a volatile solvent such as alcohol or turpentine. The greater amount of the resin in the varnish, the slower will be the rate of drying after application. There is no critical amount of resin which will be continually optimum. Factors such as temperature, humidity, stiffness of the acetate will contribute to making a particular selection. The compounding of the ink composition will accordingly be determined with modest effort by the man of ordinary skill after considering such factors.

Two additional indicia receiving surfaces 21, 22 are impressed upon the upper face of the tab sheet adjacent and parallel to its longitudinal edges. A pair of position indicators 23, 24 may be imprinted upon the surfaces. Each indicator comprises a series of equally sized spaces, there being twelve such spaces in each indicator. The end spaces 25, 26 have been left blank for a purpose which will appear hereafter, and the inner spaces bounded by 25, 26 have been numbered consecutively from 0 to 9, each space corresponding to one of the punched tab areas running the length of the tab sheet.

Each punched tab area, when removed as shown in FIGURE 2, forms a tab having an upper smooth face 30 and a lower adhesive coated face 31. The symmetrical upper face is divided by the line of symmetry 15 to form upper and lower symmetrical halves 32 and 33. The lower portion 34 of the lower half 33 is transparent and the upper portion 35 carries the colored indicia receiving surface and the key numbers impressed thereon. The upper half 32 of the tab is illustrated in these figures as transparent, but it will be understood that within the scope of the invention, this portion of the tab may carry an indicia receiving surface.

In FIGURE 3, a standard 6 inch index card is indicated generally at 40. The card carries at the extremities of its upper edge a pair of integral tabs 41, 42 which are conventionally provided to prevent the corners of the card from becoming dogeared from repeated usage. In this instance, the seventh tab, number "06," is shown positioned along the top edge of the tab in line with the seventh space, "6," of the position indicator.

Figure 4:
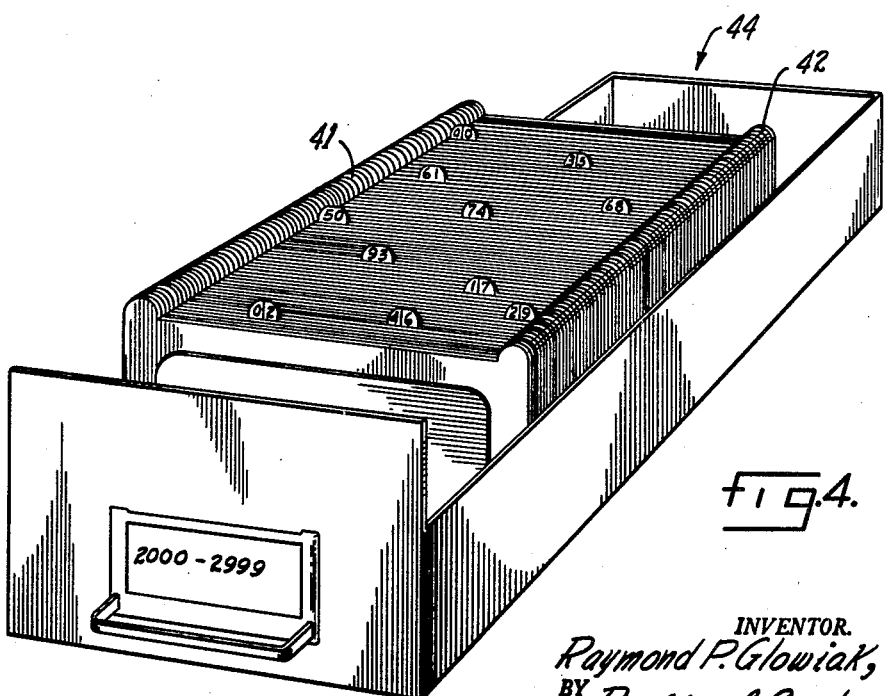
FIGURE 4 is a perspective view of a typical index card catalog drawer showing a plurality of tabbed cards, many tabs having been omitted for purposes of clarity.

A file drawer is indicated generally at 44 in FIGURE 4. In this instance, the drawer is indicated as containing those index cards whose last four digits span the one thousand numbers covering the range of 2,000 to 2,999. A large number of cards, all of whose last four digits lie in the range of 2,000 to 2,999, have been tabbed and placed within the index drawer. Although only eleven cards have been so tabbed, it will be understood that once the index card file has been completely converted to this tab system each card will carry a tab. Many are omitted for purposes of illustration only.

A holder for maintaining the sets of converters in sorted relationship is indicated generally at 50 in FIGURES 5 and 6. The holder comprises a pair of frame members 51, 52 having bottoms 53, 54 connected to sides 55, 56 and 57, 58, each set of sides in turn being connected to tops 59, 60. A plurality of dividers or spacers 61, 62 which are generally parallel one to another and to the tops and bottoms extend between and are integral with the sides 55, 56 and 57, 58. The inner edges of the inner sides 56 and 57 of the frame members are recessed as at 65, 66 to provide a finger catch for the converter cards contained therein.

A cover sheet is indicated generally at 70. When laid out flat, as in FIGURE 5, the cover sheet bridges the distance between the inner sides 56, 57 of the frame members by that portion indicated generally at 71, so that when the two halves are folded flat against one another, as in FIGURE 6, there will be no binding between the inner sides. The cover sheet extends outwardly as at 72, 73 from the bridge connecting portion 71 to the outer side members 55, 58 of the frame members and is folded back as at 74, 75 until it overlies approximately half of the length of each pocket formed by a divider and the side frame members. When the holder is closed, the converters cannot slip out since the folder over portions 74, 75 of the cover sheet hold them in place. Any suitable securing means, such as a permanent adhesive, may be utilized to secure the cover sheet to the frame members.

The key tabs in the index card converter may be perforated and spaced as shown in FIGURE 1, but such key tabs may be in unspaced relationship, that is, they may abut each other as shown in FIGURE 7. It has been found that abutting key tabs on index card converters are more easily removed and are removed without likelihood of damage if spacer portions, which adjoin abutting key tabs, are cut out. This is seen in FIGURE 7 where cut-out portions 80 are in the form of a diamond as defined by the two pairs of rounded edges 81 of four abutting key tabs 82, 82a, 82b and 82c.

The index card converter has a backer sheet 83 of a desired thickness to which a transparent film sheet 84 has been joined by an underlying pressure sensitive adhesive. The transparent film 84 may be acetate of a selected stiffness and softness. The indicia is printed on the key tab area and comprises an identifying color which may cover one half of a key tab area as at 85. The indicia further comprises an identifying numeral as shown at 86. The half color on the key tab area allows versatility in the practice of the method because the operator has a fewer number of colors to correlate with a given numeral indicia. For example, the second to the last numeral, which is 5, indicates that the color of the key tab is orange; and the numeral 6 indicates that one half of the key tab is colored orange. Thus, two numerical sequences involve only one color, and the converter system requires a fewer number of colors as a whole. It will be appreciated that other special configurations of a color may be used as an indicia without departing from the teachings of this invention.

In preparing index card converters which employ acetate as a film, ordinary offset printer's ink containing alkyd varnish is used to print the colors on the film. It is required that any one index converter be printed only with one identifying color, but it is preferred to use several layers of the same color on acetate in order to obtain a more serviceable and durable color identifying index converter. To attain this end, it has also been found serviceable to use a base or primer layer of white ink upon which the particular identifying color is subsequently printed. Following the printing of the last layer of a particularly colored ink, a suitable sealer may be applied to add further protection to the printed color. Such sealers are conventional and need only be transparent and have some degree of hardness to serve as a protective substance. The conventional way to apply the sealer is as a spray, and a suitable spray could contain a cellulose product or cellulose derivative dissolved in an organic volatile solvent. After the solvent evaporates, the sealer is left on the acetate as a thin transparent film providing some hardness.

The process for preparing index converters is diagrammatically shown in FIGURE 8 wherein a roll of acetate film 90 and a roll of paper backing 91 are pressed together by contact rollers 94 and 94a. Before the acetate and paper backing is pressed together, a pressure sensitive adhesive is applied at 92 to one side of the acetate. A heat bulb 93 may be interposed to dry the adhesive mass. The joined acetate and paper backing come into contact with a roller assembly wherein a white primer color is transferred to the acetate. The roller assembly includes a rubber plate cylinder 95 which contacts a pair of plate cylinders 96 and 97. A plurality, in this instance three, of inking rollers, 98, 99 and 100, contact each of the plate cylinders along about one-third of the circumference of the plate cylinders. Ink is transferred from a suitable source (not shown) to the inking rollers, then to the plate cylinders, and from there to the rubber plate cylinder where it is transferred to the acetate. A similar roller assembly indicated generally at 101 is then used for transferring a particular color, say red, on top of the previous coat of white ink. A second layer of the same color ink is then transferred to the acetate by similar roller assembly 102. The index converter with printed color indicia is then given a sealer coat at 103, and the index converter is then perforated and, optionally, cutout portions are removed at 104. Index card converters of the desired dimension are then cut at 106.

The index converters have been described as having position indicators as at 23 and 24 in FIGURE 1. A position indicator is important for the practice of the process but it is not necessary for such indicators to be present on the index converters. It is seen that no position indicator is present on the converter shown in FIGURE 7. A separate measuring rule may be used to position the tabs on the index cards; also, a position indicator may be printed at a convenient place on the cover holder shown in FIGURE 5. Other means are possible for indicating the position of the key tabs on the index cards.

The use and operation of the invention is as follows:

To convert a conventional index card 40 from its present classification system to the key number system of this invention, the card is first removed from the index drawer. In the illustrated example, account number 2306 has been chosen and thus a converter has been selected having the reference number "06" on it. Index tab "06" is then peeled off from the converter, preferably from the side. A converter card is then laid against it. If the card is a standard 6 inch size, the upper, smaller position indicator scale 23 will be aligned with the top edge of the card a short distance therebelow, as shown in FIGURE 3. The lower transparent portion 34 of the tab is then pressed onto the top of the card in line with position 6 of the position indicator. The tab is then bent back upon itself so that its upper portion 32 likewise overlies the rear of the card and only the smooth, upper face 30 of the tab is exposed.

Since there are ten numbers ending with the digits 06 between 2,000 and 2,999, ten card converters each having the number 06 are need to completely cover the range. There are also ten numbers ending in the numerals 16 in the range of 2,000 to 2,999, ten numbers ending in the reference numerals 26 in the same range, and so on up to numbers ending in reference numerals 96. If every number in the given range is utilized, there would be 100 cards out of the 1,000 having tabs located in the number 6 position. By utilizing ten different colors, however, one for each different set of numbers whose last digit is 6, the possible choices in locating any particular number whose last digit is 6 is reduced to ten. Thus, if the 06 numbers are printed in a broken color, say for example, the left half being uncolored and the right half orange, all ten of the numbers ending in reference numerals 06 can be easily spotted in the card drawer. In fact, with the use of only five different colors, 1,000 numbers can be easily broken down into choice groups of ten by utilizing solid and broken colors. For purposes of description I will refer to a set as comprising ten converter cards, each having ten separable tab areas, each converter card carrying a reference number series of ten consecutive numbers, the series being consecutive. The 100 numbers from 00 to 99 are usually most advantageously utilized. Ten sets therefore cover a range of 1,000 consecutive numbers.

Once an index card system has been converted to the color tab number system, the use of the system is tremendously facilitated. At the commencement of the day's operations in a small loan office for example, a file clerk may be told to pull a group of account number cards including account number 2306. The clerk merely looks at the last reference numeral and seeing that it is a 6, immediately directs his attention to the 6 column in the index card drawer. If the number 06 is designated by, say, a broken orange color, it is only necessary to pick out those cards carrying tabs in the six column which are one half orange. At the end of the day, when the card is to be returned to its file, it is not necessary to refile it in any particular location. The card is merely placed at the front of the file and if it is needed a day or month or a year later it can be quickly located by exactly the same process.

It is never necessary for the file clerk to read the index cards in returning the cards to the file, and it is only necessary to look at a maximum of ten cards in locating any particular card in the file. In small loan offices where the account cards are pulled permanently once the account is no longer active, there may only be 300 or 400 cards in the 1,000 number range of the illustrated example. Assuming that there were three active accounts whose last two digits are 06, it would then only be necessary to glance at a maximum of three cards, more probably only two and quite possibly just one. Since the three 06 cards would nearly always be widely separated, the correct card could easily be located by quickly flipping the cards. No laborious sorting of a run of physically adjacent cards would be necessary.

Although the illustrative system has utilized only five colors, the colors being used in combination with uncolored areas and in solid, it is entirely feasible to devise a system utilizing ten colors. As soon as the file clerk learns to identify a color with a given set of reference numerals, it is an easy matter to locate any particular card in this system.

The indicia carrying sheet and the backing sheet have been described as of a preferred type, that is, acetate and kraft paper. It should however be understood that a wide variety of indicia carrying and backing sheets may be used in the practice of the invention. It is only required that the indicia carrying sheet be stiffer and harder than the backing sheet so that the sheets may be more easily separated. It is further required that such sheets be retained in adhesive relationship with ordinary pressure sensitive adhesives. While offset printer's ink has been described as preferred for acetate, other color agents may be selected either for acetate or for other indicia carrying sheets. It is only required that a color, or equivalent indicating indicia, be impressed on and retained on the tab areas of the indicia carrying sheet so that such tabs may be used within the scope of the invention.

The above description is intended to be illustrative only and therefore, the scope of the invention should only be limited by the scope of the hereinafter appended claims.

I claim:

1. A tab forming card, said tab forming card including backer sheet means, and an elongated tab sheet means, said tab sheet means having a plurality of discrete tab forming areas formed therein inwardly of the longer side edges thereof,
said backer sheet means and tab sheet means being separably secured to one another by adhesive means,
each of said tab forming areas being peripherally continuous,
said backer sheet means being imperforate over at least those areas underlying the peripheries of the separable tab forming areas,
each of said separable, peripherally continuous tab forming areas being removable from the backer sheet means, and being bounded by a closed cut line,
each of said separable tab areas having a first, transparent portion adapted to be secured to an edge of a receiving structure, and a second, relatively opaque portion capable of presenting identifying indicia.

2. The article of claim 1 further characterized in that the adhesive means is co-extensive with at least those portions of the face of the backer sheet means which is disposed in opposition to those portions of the face of the tab sheet means which forms the tab areas.

3. A multiple tab unit, said unit including
an elongated single ply tab sheet in which are formed, between its ends,
a plurality of discrete tab forming structures bounded by peripherally continuous cut lines removably secured to
a unitary carrier sheet which maintains the tab forming structures in fixed relationship to one another between the ends of the carrier sheet,
each tab forming structure being secured only to the carrier sheet whereby any desired tab forming structure may be separated from the carrier independently of any other tab forming structure, and the same relative positions of the remaining tab forming structures will be maintained between themselves and with respect to the carrier sheet,
the width of the carrier sheet being longer than the length of a tab forming structure,
each of said tab forming structures having a first, transparent portion adapted to be secured to an edge of a receiving structure, and a second, relatively opaque portion capable of presenting identifying indicia.

4. The multiple tab unit of claim 3 further characterized in that the tab forming structures lie within, and are spaced from, the boundaries of the carrier sheet.

5. The multiple tab unit of claim 3 further characterized in that at best a portion of each tab forming structure is separated from each adjacent tab forming structure by a common cut line.

6. The multiple tab unit of claim 3 further characterized in that those portions of the tab sheet completely bounded by the cut lines which form the edges of adjacent tab forming structures are cut away.

7. The multiple tab unit of claim 3 further characterized in that the tab forming structures are formed from sheet material which is transparent, the opaque portion of each tab forming structure being formed by ink carried by the tab forming structure.

8. A conversion unit for converting a card system wherein the system information is cataloged on a number basis to a key number and position system, said unit including, in combination:
a plurality of card converters,
each card converter including a backer sheet and a tab sheet,
said sheets being separably secured one to another by a layer of pressure sensitive adhesive,
said tab sheet having a multiplicity of separable tab areas,
each of said tab areas being separately removable with its adhesive from the backer sheet and the surrounding portions of the tab sheet,
said separable tab areas each having a lower transparent portion adapted to be secured by the adhesive it carries to an upper edge of a card and and an indicia receiving surface overlying the transparent portion,
the indicia receiving surfaces on all tab areas on each converter being of a like color arrangement,
each card converter being of a different color and each carrying a different series of consecutive numbers, one number on each tab area, said series being consecutive from card converter to card converter,
the number of tab areas on each card converter being equal to a series of numbers in which the last digit appears only once,
the location of each of two tab areas ending in the same digit in each of any two card converters being in the same relative position with respect to the first tab area in its associated series from card converter to card converter.

9. The conversion unit of claim 8 further characterized in that said conversion unit consists of ten card converters, and
the consecutive series of members on each card converter begins with a number whose last digit is 0 and ends with a number whose last digit is 9,
whereby the number of cards able to be converted from a single conversion unit is equal to the product of the number of card converts times the number of colors employed times the number of numbers in a card converter series.

(References on following page)

References Cited by the Examiner

UNITED STATES PATENTS

| | | | |
|---|---|---|---|
| 850,245 | 4/07 | Newald | 129—16.8 |
| 1,053,671 | 2/13 | Stillwell | 129—16.8 |
| 1,315,696 | 9/19 | Alstrand | 229—72 |
| 1,594,118 | 7/26 | Ritter | 129—16.5 |
| 1,683,468 | 9/28 | Jonas | 129—16.5 |
| 1,716,846 | 6/29 | Baker | 229—72 |
| 1,876,181 | 9/32 | Tussing. | |
| 2,008,429 | 7/35 | Weatherhead. | |
| 2,095,437 | 10/37 | Fox. | |
| 2,213,666 | 9/40 | Burk. | |
| 2,370,527 | 2/45 | Figuccion | 40—23 |
| 2,376,904 | 5/45 | Cookston | 229—72 |
| 2,607,711 | 8/52 | Hendricks | 206—59 |
| 2,761,453 | 9/56 | Ostwaldt | 129—16.8 |
| 2,764,501 | 9/56 | Perri | 206—56 |
| 2,797,801 | 7/57 | Bishop | 206—56 |
| 2,847,119 | 8/58 | Padura | 206—56 |
| 2,880,862 | 4/59 | Sermattei | 206—59 |
| 2,893,144 | 7/59 | Cunningham | 40—23 |
| 2,914,166 | 11/59 | Bihler | 206—56 |
| 2,930,632 | 3/60 | Winders | 156—253 |
| 2,944,124 | 7/60 | Arnold | 206—56 |
| 3,001,306 | 9/61 | Wilkinson | 40—23 |
| 3,032,463 | 5/62 | Morgan | 156—253 |
| 3,074,133 | 1/63 | Jones | 40—2 |

FOREIGN PATENTS 1,185,802   2/59   France.

THERON E. CONDON, *Primary Examiner.*

FRANKLIN T. GARRETT, *Examiner.*